(12) United States Patent
Eckerle

(10) Patent No.: US 11,333,218 B2
(45) Date of Patent: May 17, 2022

(54) CENTRIFUGAL PENDULUM DEVICE HAVING A PRE-STRESSING ELEMENT FOR GUIDING THE CYLINDRICAL ROLLERS

(71) Applicant: Schaeffler Technologies AG & Co. KG, Herzogenaurach (DE)

(72) Inventor: Simon Eckerle, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 307 days.

(21) Appl. No.: 16/603,724

(22) PCT Filed: Apr. 11, 2018

(86) PCT No.: PCT/DE2018/100327
§ 371 (c)(1),
(2) Date: Oct. 8, 2019

(87) PCT Pub. No.: WO2018/206036
PCT Pub. Date: Nov. 15, 2018

(65) Prior Publication Data
US 2021/0095739 A1     Apr. 1, 2021

(30) Foreign Application Priority Data

May 10, 2017   (DE) .......................... 102017110022.9

(51) Int. Cl.
*F16F 15/14*         (2006.01)
(52) U.S. Cl.
CPC ........ *F16F 15/145* (2013.01); *F16F 15/1421* (2013.01); *F16F 15/1435* (2013.01);
(Continued)
(58) Field of Classification Search
CPC .... F16F 15/14; F16F 15/1414; F16F 15/1421; F16F 15/1435; F16F 15/145; F16F 2228/08; F16F 2230/0052; F16F 2232/02
See application file for complete search history.

(56) References Cited

U.S. PATENT DOCUMENTS 9,328,796 B2 * 5/2016 Movlazada ........... F16F 15/145
10,247,274 B2 * 4/2019 Dinger .................. F16F 15/145

FOREIGN PATENT DOCUMENTS

CN   103038540 A    4/2013
DE      806073 C    6/1951
(Continued)

OTHER PUBLICATIONS

Machine translation of DE 102013220287 A1 obtained on Nov. 8, 2021.*

(Continued)

*Primary Examiner* — Adam D Rogers
(74) *Attorney, Agent, or Firm* — Nathan Smith

(57) ABSTRACT

A centrifugal pendulum device for use in a drive train of a vehicle powered by an internal combustion engine includes at least one support flange rotatable about an axis of rotation to which pendulum masses are mounted thereon in a circumferential direction via a bifilar pendulum suspension. The pendulum masses are configured to perform a relative movement with respect to the support flange when a rotational irregularity occurs in the drivetrain under effects of centrifugal force in conjunction with cylindrical rollers which are guided in roller tracks of the support flange. The pendulum masses run in opposite directions to one another and thereby absorb vibrations. The support flange includes roller tracks which are open in a direction of the axis of rotation and all the cylindrical rollers are acted upon by force by a prestressing element radially in the direction of the roller tracks.

13 Claims, 2 Drawing Sheets

(52) U.S. Cl.
CPC ... *F16F 2228/08* (2013.01); *F16F 2230/0052* (2013.01); *F16F 2232/02* (2013.01)

(56) References Cited

FOREIGN PATENT DOCUMENTS

| | | | |
|---|---|---|---|
| DE | 102009042836 A1 | | 5/2010 |
| DE | 102010049553 A1 | | 5/2011 |
| DE | 102011100895 A1 | | 12/2011 |
| DE | 102011087631 A1 | | 6/2012 |
| DE | 102011104137 A1 | | 12/2012 |
| DE | 102012220960 A1 | | 6/2013 |
| DE | 102013200143 A1 | | 8/2013 |
| DE | 102012210575 A1 | | 12/2013 |
| DE | 102012221103 A1 | | 5/2014 |
| DE | 102014214193 A1 | | 2/2015 |
| DE | 102014219328 A1 | | 3/2015 |
| DE | 102013220287 A1 | | 4/2015 |
| DE | 102013226068 A1 | | 6/2015 |
| DE | 102014224091 A1 | | 6/2015 |
| DE | 102015208010 A1 * | 11/2015 | .......... F16F 15/1421 |
| DE | 102014213749 A1 * | 1/2016 | ............ F16F 15/145 |
| DE | 102014225662 A1 | | 6/2016 |
| DE | 102017114521 A1 * | 1/2019 | ............ F16F 15/145 |
| DE | 102017114676 A1 * | 1/2019 | ............ F16F 15/145 |
| DE | 102017123897 A1 * | 4/2019 | ............ F16F 15/145 |
| DE | 102018115590 A1 * | 1/2020 | ............ F16F 15/145 |
| DE | 102018115973 A1 * | 1/2020 | ............ F16F 15/145 |
| DE | 102021100452 A1 * | 9/2021 | .............. F16F 15/14 |
| WO | 2014/005907 A1 | | 1/2014 |
| WO | 2015/140456 A1 | | 9/2015 |
| WO | 2015192846 A1 | | 12/2015 |

OTHER PUBLICATIONS

International Search Report (ISR) for PCT/DE2018/100327, Completion date of ISR Jun. 19, 2018, English Translation attached to original Document, All together 4 Pages.

* cited by examiner

CENTRIFUGAL PENDULUM DEVICE HAVING A PRE-STRESSING ELEMENT FOR GUIDING THE CYLINDRICAL ROLLERS

CROSS-REFERENCE TO RELATED APPLICATIONS

This application is the U.S. National Phase of PCT Appln. No. PCT/DE2018/100327 filed Apr. 11, 2018, which claims priority to DE 1020117110022.9 filed May 10, 2017, the entire disclosures of which are incorporated by reference herein.

TECHNICAL FIELD

The present disclosure relates to a centrifugal pendulum device of a torque-transfer device in a drivetrain of a vehicle powered by an internal combustion engine.

BACKGROUND

Centrifugal pendulum devices are used for vibration damping, in particular for insulating rotational vibrations, in drivetrains of motor vehicles which are driven by means of an internal combustion engine. In this case, the vibrational energy or the vibration amplitude is damped or absorbed by pendulum masses of the centrifugal pendulum device vibrating in the opposite direction to the vibrations being damped.

DE 10 2011 087 631 A1 discloses a centrifugal pendulum device in which pendulum masses which are distributed over the circumference are assigned to a support or pendulum flange, said pendulum masses being suspended from the support flange in an oscillating manner in a rotational plane. The suspension and adjustment of the pendulum masses in respect of the pendulum flange takes place by means of rollers or roller bodies which are guided by the support flange and the pendulum masses in tracks which are curved in opposite directions to one another.

A centrifugal pendulum device in a torque transfer device is known front DE 10 2009 042 836 A1. Pendulum masses are arranged on a pendulum flange over the periphery on both sides with limited pivotability. For this purpose, the pendulum masses are provided with tracks arranged on cutouts and the pendulum Range is provided with matching cutouts with tracks. In this case, two pendulum masses arranged opposite one another on both pendulum flange sides are connected by means of connection members, such as connection bolts which pass through the cutouts in the pendulum flange, and a roller body is inserted in each case into the matching cutouts in the pendulum masses and the pendulum flange with the corresponding tracks.

SUMMARY

The problem addressed by the present disclosure is that of supplying a functionally improved centrifugal pendulum device with reduced noise emission which can be produced in a cost-effective manner.

This problem is solved by a centrifugal pendulum device as as described in the present disclosure. Advantageous embodiments are specified in the claims.

The problem is solved by a centrifugal pendulum device in which the roller tracks for the cylindrical rollers in the support flange are open in the direction of the axis of rotation and all cylindrical rollers are acted upon by the force of a one-part or multi-part prestressing element radially in the direction of an outer contour of the roller tracks.

The prestressing element, which should also be denoted as a spring washer, advantageously suppresses or reduces play between the cylindrical rollers and the roller tracks which is responsible for detrimental noise generation, in that the cylindrical rollers are pressed by a radial force of the prestressing element acting as constantly as possible against the outer contours of the roller tracks in the support flange.

With the help of the design of the support flange according to the present disclosure which encloses roller tracks open on the inside, an enlarged or additional installation space for receiving the prestressing element is created in the direction of the axis of rotation of the centrifugal pendulum device.

Due to the deflected cylindrical rollers, the constant bearing of the cylindrical rollers on the respective roller track, additional deformation of the prestressing element occurs. The spring force resulting from this acts against the roller deflection and is thereby able to bring about a reduction in impact noises. The additional spring capacity of the prestressing element furthermore brings about increased energy absorption by the centrifugal pendulum device.

In particular, the present disclosure gives rise to reduced noise generation at low speeds, particularly when the internal combustion engine is in the starling and stopping phase. During these operating states, hitherto bifilar centrifugal pendulum devices tend towards unwanted noise emission due to rattling noises. These occur in the case of pendulum masses guided over cylindrical rollers due to the falling or displacement of the pendulum masses and or of the rollers in the direction of the axis of rotation of the centrifugal pendulum device or due to the impact of the cylindrical rollers against the ends of the roller tracks.

The roller tracks which have an open design on the inside according to the present disclosure lead to an advantageous reduced support flange mass. Moreover, the roller track geometry simplifies production of the support flange and also the coupling or assembly of the cylindrical rollers.

An effective movement coupling of the pendulum masses advantageously occurs due to the present disclosure, since during deflection movements of the pendulum masses, for example, the non-slipping cylindrical rollers are also coupled with one another by the one-part or multi-part prestressing element.

The deflection of a single pendulum creates a rotational movement of its cylindrical rollers. Direct contact with the cylindrical rollers causes the prestressing element to turn in the opposite direction relative to the direction of rotation of said cylindrical rollers. Due to the rotational movement of the prestressing element, the cylindrical rollers of all other pendulum masses are driven, said pendulum masses thereby being deflected uniformly to the first deflected pendulum mass.

This effect advantageously reduces the different pendulum mass deflections occurring in the case of traditional centrifugal oscillation, in particular when the internal combustion engine is in the start/stop states, which pendulum mass deflections can otherwise lead to a great imbalance and vibrations. Since uneven pendulum mass deflections cannot be ruled out, even in different speed ranges of the internal combustion engine, the coupling of the pendulum masses via the prestressing element according to the present disclosure leads to a general improvement in all operating states.

The concept according to the present disclosure including a prestressing element advantageously further improves the efficiency or functioning of the centrifugal pendulum device and can be achieved cost-effectively. The additional installation space created in the support flange due to the roller tracks being open on the inside may be advantageously used for alternative torsional vibration damper or DMF configurations.

According to an embodiment of the present disclosure, a closed or slotted, radially prestressed spring washer is used as the prestressing element, the outer contour of said spring washer being directly in contact with the cylindrical rollers. In this case, a prestressing force of the prestressing element always guarantees a bearing of the cylindrical rollers on the roller tracks.

A prestressing force is provided for the prestressing element, which prestressing force always ensures a bearing of all cylindrical rollers on the associated roller tracks. The size of the prestressing force or the spring rate of the prestressing element is selected in such a manner that even in the starting and stopping operating slates of the internal combustion engine, in which the pendulum masses can be displaced in the direction of the axis of rotation, the cylindrical rollers are not lifted from the outer contour of the roller tracks. The play-free support of the cylindrical rollers which thereby results has a positive influence on the noise development of the centrifugal pendulum device.

The centrifugal pendulum device created according to the present disclosure preferably comprises pendulum masses which are positioned on both sides of the support flange and are arranged in a bifilar oscillating manner relative to the pendulum flange. In this case, two pendulum masses connected via spacer elements form a pair of pendulum masses in each case.

In the installed stale, the prestressing element is supported on the outside solely on the cylindrical rollers and, at the same time, guided axially between two annular rims of the cylindrical rollers spaced axially apart from one another. At the same time, the cylindrical rollers are guided via the annular rims on the support flange. Furthermore, by means of the annular rims of the cylindrical rollers positioned on both sides of the support flange, an axial space is defined between the pendulum masses. The spacer elements connecting two pendulum masses in each case run with play through a recess in the support flange likewise open in the direction of the axis of rotation.

The one-part or multi-part, closed or slotted prestressing element according to the present disclosure may be produced from plastic or a metallic material. Spring steel is suitable as the metallic material, for example. The width of the prestressing element advantageously corresponds to the wall thickness of the support flange.

Due to the roller tracks being open in the direction or the axis of rotation of the centrifugal pendulum device, the support flange configured according to the present disclosure has a reduced installation height. In the installation state, the support flange is connected via radially outwardly directed fastening straps to a surrounding structure, particularly directly or indirectly to the secondary part of the dual-mass flywheel.

BRIEF DESCRIPTION OF THE DRAWINGS

The present disclosure is described in greater detail below with the help of an exemplary embodiment. The present disclosure is not, however, limited to the exemplary embodiment shown. In the drawings.

DETAILED DESCRIPTION

Figure 1:
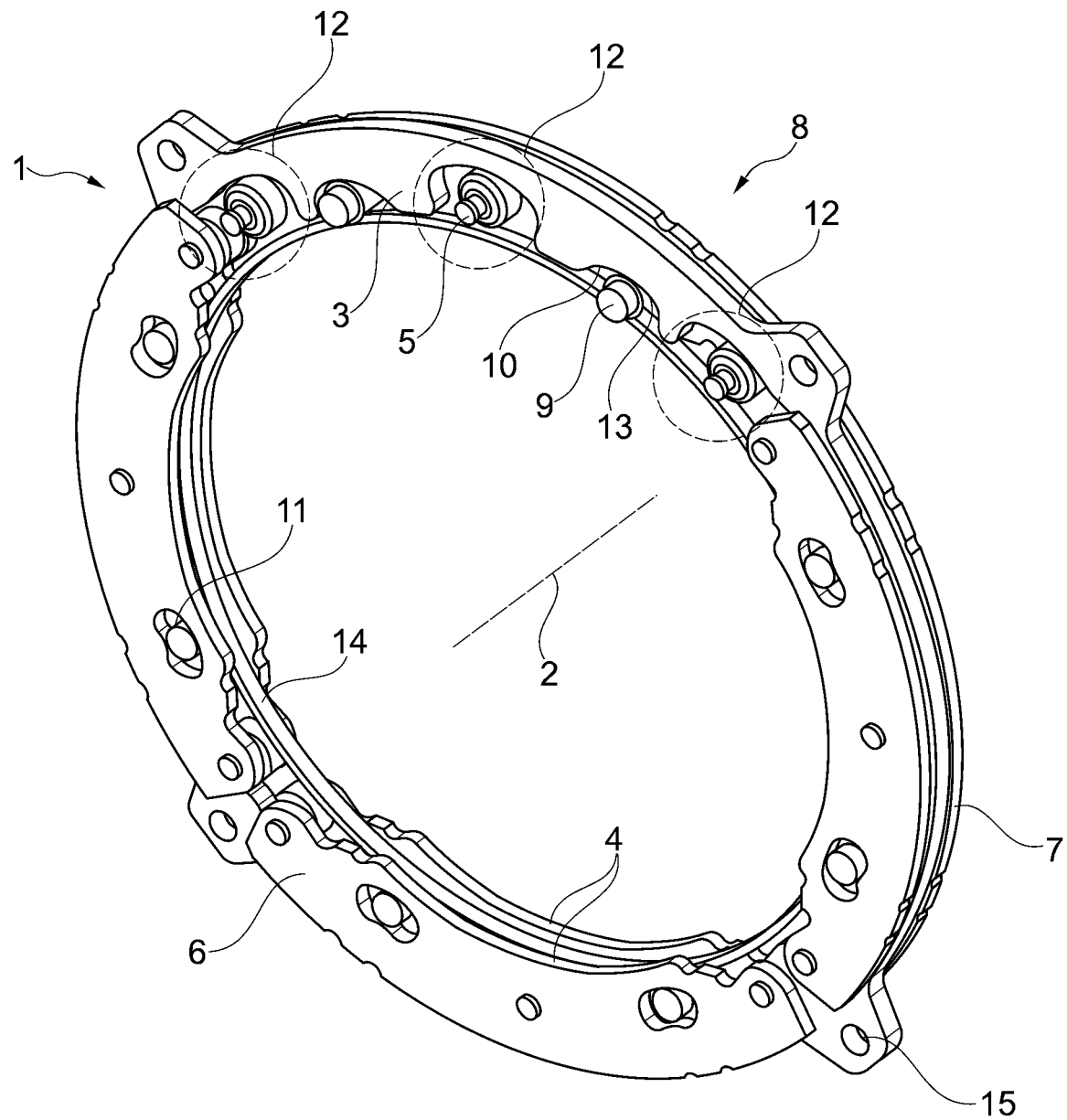
FIG. 1: shows in one perspective, a centrifugal pendulum device according to the present disclosure in which all cylindrical rollers are exposed to force by a prestressing element.

FIG. 1 shows a centrifugal pendulum device 1 according to the present disclosure which is assigned in a drivetrain to a torque transfer device (not shown) preferably designed as a dual-mass flywheel of a motor vehicle powered by an internal combustion engine. The centrifugal pendulum device 1 comprises a support flange 3 rotating about an axis of rotation 2 which is preferably operatively connected to a secondary part of the dual-mass flywheel and which is intended to receive multiple pairs of pendulum masses 4 arranged one after the other in the circumferential direction. In the operating state, the centrifugal pendulum device 1 allows a relative movement of the pendulum mass pairs 4 in respect of the support flange 3 by means of a known mode of operation when a rotational irregularity occurs in the drivetrain. Each pendulum mass pair 4 comprises two axially spaced pendulum masses 6, 7 which are fixedly connected by spacer elements 5 preferably configured as spacer rivets and which are arranged in a bifilar oscillating manner in respect of the support flange 3. A pendulum suspension 8 includes two spaced cylindrical rollers 9 for each pendulum mass pair 4 which are guided in roller tracks 10, 11 of the support flange 3 and the pendulum masses 6, 7 which run in opposite directions to one another. By means of the pendulum suspension 8, when a rotational irregularity occurs in the drivetrain a vibration-damping relative movement of the pendulum mass pairs 4 takes place in relation to the support flange 3 under the effects of centrifugal force.

In order to illustrate the pendulum suspension 8, the centrifugal pendulum device 1 is shown locally in FIG. 1 without the front pendulum mass 6. In this case, the structural design of the support flange 3 is made clear, whereof the roller tracks 10 for the cylindrical rollers 9 and also all recesses 12 intended for the spacer elements 5 of the pendulum mass pairs 4 are open in the direction of the axis of rotation 2. The cylindrical rollers 9 in this case are supported on the inside on a one-part prestressing element 14 which at the same time exposes all cylindrical rollers 9 to a force radially in the direction of an outer contour 13 of the roller tracks 10. By means of the radially prestressed prestressing element 14 which is preferably configured as a spring washer, a play-free installation position of all cylindrical rollers 9 results. In the installation state, the support flange 3 is connected in a positionally fixed manner via four fastening straps 15 arranged symmetrically on the circumferential side to a surrounding structure (not shown), for example directly or indirectly to a secondary mass of the dual-mass flywheel.

Figure 2:
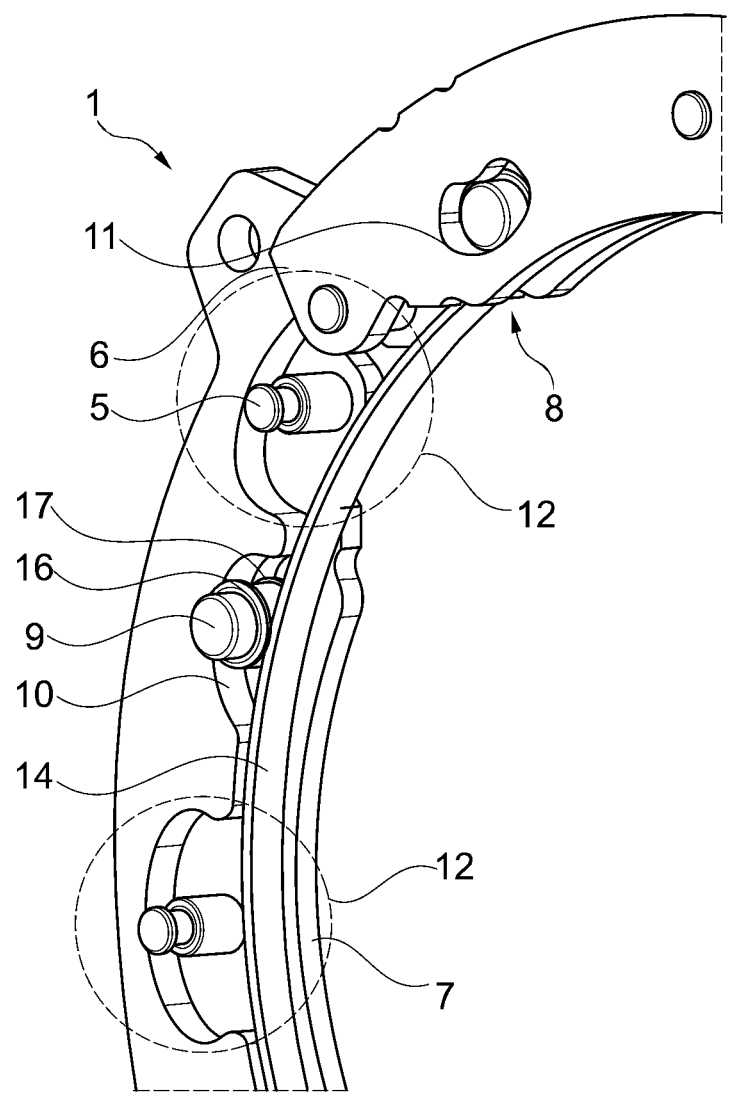
FIG. 2: shows a detail of the centrifugal pendulum device depicted in FIG. 1 as an enlarged representation.

FIG. 2 shows in one view a partial region of the centrifugal pendulum device 1. The prestressing element 14 supported in a spring-loaded manner on the cylindrical rollers 9 is guided on axially spaced annular rims 16, 17 of the cylindrical rollers 9 which at the same lime define a space between the pendulum masses 6, 7 and the prestressing element 14 or the support flange 3. Furthermore, the annular rims 16, 17 in the region of the roller track 10 are guided laterally to the support flange 3 and thereby secure the installation position of the cylindrical rollers 9.

LIST OF REFERENCE NUMBERS

1 Centrifugal pendulum device
2 Axis of rotation

3 Support flange
4 Pendulum mass pair
5 Spacer element
6 Pendulum mass
7 Pendulum mass
8 Pendulum suspension
9 Cylindrical rollers
10 Roller track
11 Roller track
12 Recess
13 Outer contour
14 Prestressing element
15 Fastening strap
16 Annular rim
17 Annular rim

The invention claimed is:

1. A centrifugal pendulum device for use in a drivetrain of a vehicle powered by an internal combustion engine comprising: at least one support flange rotatable about an axis of rotation to which pendulum masses are mounted thereon in a circumferential direction via a bifilar pendulum suspension which includes cylindrical rollers, wherein the pendulum masses are configured to perform a relative movement with respect to the support flange when a rotational irregularity occurs in the drivetrain under effects of centrifugal force in conjunction with the cylindrical rollers which are guided in roller tracks of the support flange and the pendulum masses run in opposite directions to one another and thereby absorb vibrations, wherein the support flange includes the roller tracks which are open in a direction of the axis of rotation and all of the cylindrical rollers are acted upon by force by a prestressing element radially in the direction of the roller tracks, wherein the prestressing element is guided on an outside of the cylindrical rollers.

2. The centrifugal pendulum device as claimed in claim 1, wherein a closed or slotted, one-part or multi-part, radially prestressed spring washer is provided as the prestressing element, wherein the spring washer is in direct contact with the cylindrical rollers.

3. The centrifugal pendulum device as claimed in claim 1, wherein a prestressing force of the prestressing element always ensures a bearing of all of the cylindrical rollers against an outer contour of the roller tracks.

4. The centrifugal pendulum device as claimed in claim 1, wherein two of the pendulum masses in each case which are positioned on both sides of the support flange and connected by spacer elements form a pendulum mass pair.

5. The centrifugal pendulum device as claimed in claim 4, wherein the spacer elements provided between the pendulum masses run with play through a recess in the support flange which is open in the direction of the axis of rotation.

6. The centrifugal pendulum device as claimed in claim 1, wherein the prestressing element is guided axially between axially spaced annular rims of the cylindrical rollers.

7. The centrifugal pendulum device as claimed in claim 6, wherein the annular rims of the cylindrical rollers positioned on both sides of the support flange each define an axial space relative to the pendulum masses.

8. The centrifugal pendulum device as claimed in claim 1, wherein the prestressing element is produced from a plastic or a metallic material.

9. The centrifugal pendulum device as claimed in claim 1, wherein the support flange is connected to a surrounding structure by radially outwardly oriented fastening straps.

10. A centrifugal pendulum device for a vehicle, comprising:
a support flange rotatable about an axis of rotation;
at least two pendulum masses mounted on opposite axial sides of the support flange and arranged to be movable relative to the support flange via cylindrical rollers, the cylindrical rollers being guided in roller tracks defined in the support flange, wherein the roller tracks are open in a direction of the axis of rotation; and
a radially prestressed element supported on an outside of the cylindrical rollers, wherein the radially prestressed element is guided axially between axially spaced annular rims of the cylindrical rollers.

11. The centrifugal pendulum device as claimed in claim 10, wherein the cylindrical rollers are pressed against outer contours of the roller tracks by a radial force of the radially prestressed element.

12. The centrifugal pendulum device as claimed in claim 10, wherein the axially spaced annular rims define a space between the pendulum masses.

13. The centrifugal pendulum device as claimed in claim 10, wherein the radially prestressed element is a spring washer.

* * * * *